(12) United States Patent
Okafor et al.

(10) Patent No.: US 11,126,344 B2
(45) Date of Patent: Sep. 21, 2021

(54) SYSTEMS AND METHODS FOR SHARING CONTENT

(71) Applicant: Facebook, Inc., Menlo Park, CA (US)

(72) Inventors: Chukwuemeka Okafor, Oakland, CA (US); Junsik Kim, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/254,529

(22) Filed: Jan. 22, 2019

(65) Prior Publication Data

US 2020/0233574 A1 Jul. 23, 2020

(51) Int. Cl.
*G06F 3/0485* (2013.01)
*G06F 3/16* (2006.01)
*H04L 12/58* (2006.01)

(52) U.S. Cl.
CPC .......... *G06F 3/04855* (2013.01); *G06F 3/165* (2013.01); *H04L 51/32* (2013.01)

(58) Field of Classification Search
CPC .............................. G06F 3/04855; G06F 3/165
See application file for complete search history.

(56) References Cited

U.S. PATENT DOCUMENTS

| | | | | |
|---|---|---|---|---|
| 5,371,846 A | * | 12/1994 | Bates | G06F 3/04855 345/684 |
| 5,623,588 A | * | 4/1997 | Gould | G06F 3/04855 345/157 |
| 5,732,184 A | | 3/1998 | Chao et al. | |
| 6,157,381 A | * | 12/2000 | Bates | G06F 3/04855 345/684 |
| 6,486,896 B1 | * | 11/2002 | Ubillos | G06F 3/04855 715/784 |
| 6,670,966 B1 | | 12/2003 | Kusanagi | |
| 6,816,174 B2 | * | 11/2004 | Tiongson | G06F 3/04855 715/716 |
| 7,765,491 B1 | * | 7/2010 | Cotterill | G06F 3/0485 715/833 |
| 8,538,761 B1 | | 9/2013 | Moulios et al. | |
| 9,836,204 B1 | * | 12/2017 | Huang | G06F 3/04855 |
| 10,474,422 B1 | * | 11/2019 | Venti | H04L 67/10 |
| 10,783,181 B1 | * | 9/2020 | Detroja | G06F 3/165 |
| 2001/0040592 A1 | | 11/2001 | Foreman et al. | |

(Continued)

FOREIGN PATENT DOCUMENTS

GB 2235815 A 3/1991

OTHER PUBLICATIONS

International Patent Application No. PCT/US2020/014371, International Search Report and Written Opinion dated May 26, 2020, 11 pages.

*Primary Examiner* — Ryan Barrett
(74) *Attorney, Agent, or Firm* — Sheppard Mullin Richter & Hampton LLP

(57) ABSTRACT

Systems, methods, and non-transitory computer-readable media can provide an interface for associating selected musical content with visual content to be shared through a social networking system. A main playback scrubber for navigating to different parts of the selected musical content can be provided in the interface. A precision playback scrubber for identifying a portion of the selected musical content to be associated with the visual content being shared can be provided in the interface with more precision than the main playback scrubber.

19 Claims, 13 Drawing Sheets

(56) References Cited

U.S. PATENT DOCUMENTS

| | | | |
|---|---|---|---|
| 2007/0247462 A1* | 10/2007 | Bell | G06T 11/20 345/440 |
| 2008/0034316 A1* | 2/2008 | Thoresson | G06F 3/04855 715/781 |
| 2008/0158261 A1* | 7/2008 | Gould | G11B 27/28 345/666 |
| 2009/0199119 A1* | 8/2009 | Park | G06F 3/04847 715/765 |
| 2010/0156830 A1* | 6/2010 | Homma | G06F 3/0488 345/173 |
| 2010/0231534 A1* | 9/2010 | Chaudhri | G06F 3/0481 345/173 |
| 2010/0251165 A1* | 9/2010 | Williams | G06F 3/0482 715/784 |
| 2010/0251167 A1* | 9/2010 | DeLuca | G06F 3/0485 715/786 |
| 2010/0269038 A1* | 10/2010 | Tsuda | G06F 3/0485 715/702 |
| 2010/0287154 A1* | 11/2010 | Tee | G06F 3/04855 707/708 |
| 2011/0276334 A1* | 11/2011 | Wang | G06F 16/95 704/270 |
| 2012/0047437 A1* | 2/2012 | Chan | G06F 3/0482 715/720 |
| 2013/0132892 A1* | 5/2013 | Lentz | G06F 3/0488 715/786 |
| 2014/0013243 A1* | 1/2014 | Flynn, III | G06F 3/0488 715/753 |
| 2014/0157181 A1* | 6/2014 | Fukuda | G06F 3/0483 715/776 |
| 2014/0310269 A1* | 10/2014 | Zhang | G06F 16/68 707/725 |
| 2015/0012857 A1* | 1/2015 | Tang | G06F 3/04886 715/768 |
| 2015/0052468 A1* | 2/2015 | Adany | G06F 3/04847 715/771 |
| 2015/0293687 A1* | 10/2015 | Seong | G06F 3/0484 715/825 |
| 2015/0363101 A1* | 12/2015 | Kritt | G06F 3/0488 715/720 |
| 2016/0011761 A1* | 1/2016 | Latin-Stoermer | G06F 3/04842 715/716 |
| 2017/0093769 A1* | 3/2017 | Lind | G06F 3/04842 |
| 2018/0046365 A1* | 2/2018 | Schuler | G06F 3/0482 |
| 2019/0354272 A1* | 11/2019 | Steinwedel | G06F 3/165 |
| 2019/0355337 A1* | 11/2019 | Steinwedel | H04N 21/4223 |
| 2020/0356593 A1* | 11/2020 | Azzinnari | G06F 3/165 |

* cited by examiner

SYSTEMS AND METHODS FOR SHARING CONTENT

FIELD OF THE INVENTION

The present technology relates to the field of networked communications. More particularly, the present technology relates to techniques for creating and sharing content with users in a computerized networking system.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to provide an interface for associating selected musical content with visual content to be shared through a social networking system. A main playback scrubber for navigating to different parts of the selected musical content can be provided in the interface. A precision playback scrubber for identifying a portion of the selected musical content to be associated with the visual content being shared can be provided in the interface with more precision than the main playback scrubber.

In an embodiment, the main playback scrubber is traversable across a fixed length bar that represents an entire length of the selected musical content.

In an embodiment, the precision playback scrubber provides a magnified representation of an entire length of the selected musical content, wherein the precision playback scrubber is able to be scrolled to any given second of the selected musical content.

In an embodiment, the interface provides information for identifying the portion of the selected musical content, the information indicating portions of the selected musical content that correspond to particular lyrics.

In an embodiment, the interface provides information for identifying the portion of the selected musical content, the information indicating portions of the selected musical content that correspond to a chorus.

In an embodiment, the interface provides information for identifying the portion of the selected musical content, the information indicating portions of the selected musical content that correspond to content that is popular among users of the social networking system.

In an embodiment, the interface presents lyrics corresponding to a portion of the selected musical content that was identified using the precision playback scrubber.

In an embodiment, the systems, methods, and non-transitory computer readable media are further configured to determine a portion of the selected musical content that was identified using the precision playback scrubber and associate the portion of the selected musical content with the visual content.

In an embodiment, the systems, methods, and non-transitory computer readable media are further configured to share the visual content and the portion of the selected musical content associated with the visual content through the social networking system, wherein the portion of the selected musical content is played when the visual content is accessed.

In an embodiment, the visual content corresponds to an image, a video, or a looping video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
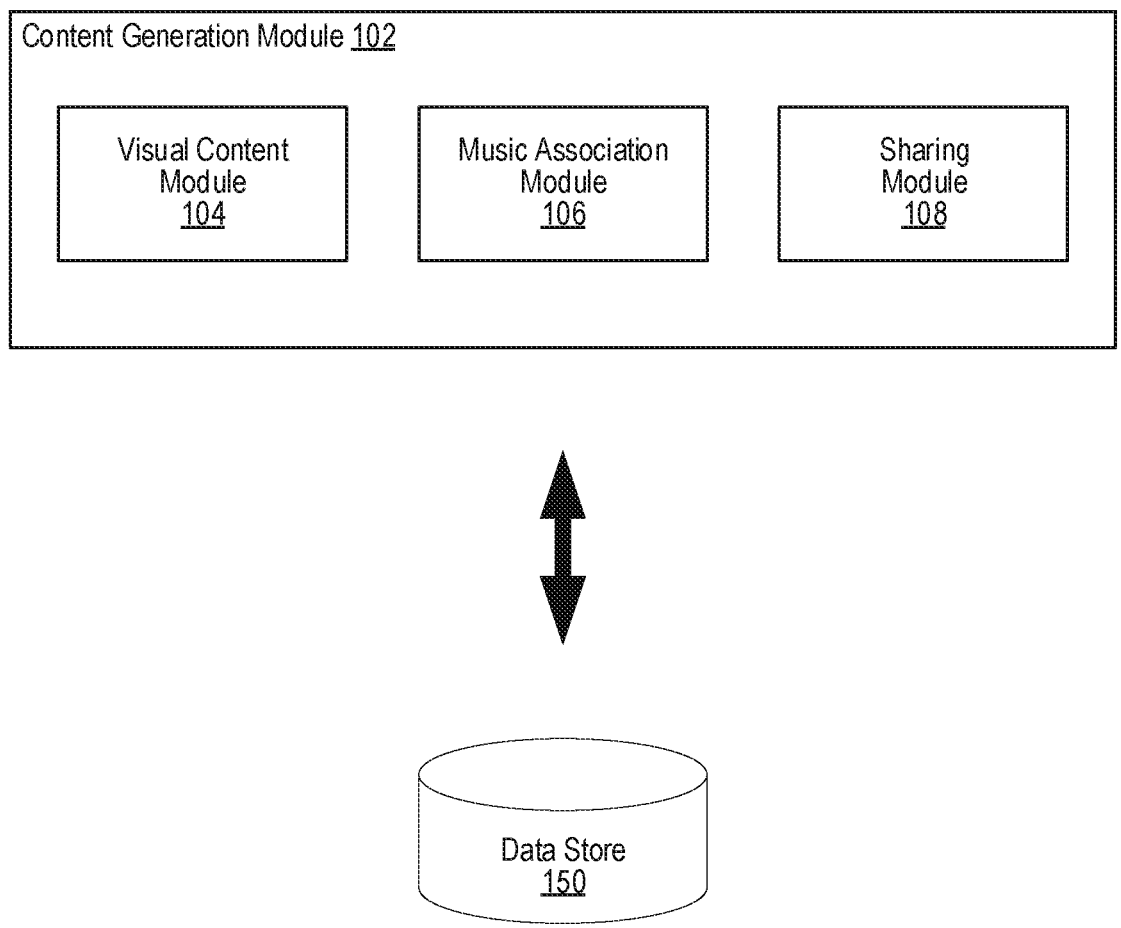
FIG. 1 illustrates an example system including an example content generation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Sharing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users can create and share content items through a content provider (e.g., a social networking system). In general, a shared (or posted) content item can include visual content (e.g., images, videos, looping videos, etc.) and related text. Conventional approaches provide users with options to modify captured visual content. For example, conventional approaches permit users to modify visual content by applying filters or visual overlays (e.g., stickers). However, conventional approaches provide limited options for enhancing visual content with audio content. For instance, conventional approaches generally do not allow users to easily navigate through musical content (e.g., a song) in its entirety for purposes of selecting audio to be associated with visual content shared through the social networking system. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users of a social networking system can associate any portion of musical content with visual content (e.g., images, videos, looping videos, etc.) being shared through the social networking system. For example, a user can associate some portion of a song with an image being shared through the social networking system. When accessed through the social networking system, the shared image can be presented with the associated portion of the song being played (or reproduced), for example, as background music. In various embodiments, the user can be provided an interface for associating portions of musical content with visual content being shared. For example, the interface can include options for selecting a song. Once a song is selected, the interface can provide a main playback scrubber that can be used to skip to different portions of the song. The interface can also include a precision playback scrubber that can be used to precisely select a portion of the song to be associated with visual content to be shared. For example, the precision playback scrubber can permit the user to select a particular portion of the song with greater precision than would be possible using the main playback scrubber. The interface can also permit the user to define a playback duration (or length) of the selected portion of the song. The selected portion of the song can be associated with the visual content being shared. The visual content can then be shared with the associated portion of the song through the social networking system. A user operating a computing device can access a posting referencing the shared content through the social networking system. In response, the user can be presented the visual content through a display screen while the associated portion of the song is played through one or more audio output devices. More details relating to the disclosed technology are provided below.

FIG. 1 illustrates an example system 100 including an example content generation module 102, according to an embodiment of the present disclosure. As shown in the example of FIG. 1, the content generation module 102 can include a visual content module 104, a music association module 106, and a sharing module 108. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the content generation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content generation module 102 or at least a portion thereof can be implemented using one or more computing devices or systems that include one or more servers, such as network servers or cloud servers. In some instances, the content generation module 102 can, in part or in whole, be implemented within or configured to operate in conjunction with a social networking system (or service), such as the social networking system 630 of FIG. 6. In some instances, the content generation module 102 can be, in part or in whole, implemented within or configured to operate in conjunction or be integrated with a client computing device, such as the user device 610 of FIG. 6. For example, the content generation module 102 can be implemented as or within a dedicated application (e.g., app), a program, or an applet running on a user computing device or client computing system. The application incorporating or implementing instructions for performing some, or all, functionality of the content generation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases but can be the same entity in other cases.

The content generation module 102 can be configured to communicate and/or operate with the at least one data store 150, as shown in the example system 100. The at least one data store 150 can be configured to store and maintain various types of data. For example, the data store 150 can store information describing various content that has been posted (or shared) by users of a social networking system. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

The visual content module 104 can be configured to access visual content (e.g., images, videos, looping videos, etc.) that can be posted (or shared) through the social networking system. In some embodiments, visual content to be posted may have been captured previously. In such embodiments, the visual content may be provided by a user or may be accessed from a local data store (e.g., the data store 150). In some embodiments, a user may want to capture visual content at the time of posting. In such embodiments, the user can be provided access to a conventional camera interface through which visual content to be posted can be captured using one or more cameras of a computing device. Many variations are possible.

The music association module 106 can be configured to associate portions of musical (or audio) content with visual content being shared through the social networking system. For example, a user can associate a portion (or segment) of a song with a video. The video can be shared through the social networking system. When accessed through the social networking system, the shared video can be presented along with the associated portion of the song being played as music. More details regarding the music association module 106 will be provided below with reference to FIG. 2.

The sharing module 108 can be configured to share content through the social networking system. In some embodiments, the sharing module 108 can provide an option that allows users to send their content to other users in direct messages. In some embodiments, the sharing module 108 can provide an option that allows users to post their content in one or more content feeds. In some embodiments, the sharing module 108 can provide an option that allows users to post their content as stories. In such embodiments, each user has a corresponding story feed in which the user can post content. When a user's story feed is accessed by another user, the sharing module 108 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., every 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time. Many variations are possible.

Figure 2:
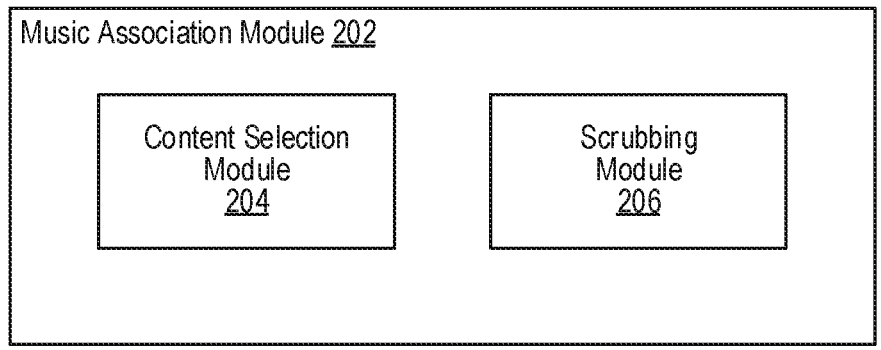
FIG. 2 illustrates an example music association module, according to an embodiment of the present disclosure.

FIG. 2 illustrates a music association module 202, according to an embodiment of the present disclosure. The music association module 202 can provide an interface (e.g., graphical user interface) through which users can associate portions of musical (or audio) content with visual content being shared through the social networking system. When accessed through the social networking system, the shared visual content can be presented along with the associated portion of the musical content being played as music. In some embodiments, the music association module 106 of FIG. 1 can be implemented with the music association module 202. As shown in the example of FIG. 2, the music association module 202 can include a content selection module 204 and a scrubbing module 206.

The content selection module 204 can be configured to provide options for selecting musical content (e.g., songs) to be associated with visual content. In various embodiments, the content selection module 204 can provide a song selection interface for selecting songs that have been categorized based on popularity, mood, genre, language, geography, and artist, to name some examples. In some embodiments, the songs included in each category may be ranked based on various criteria. For example, in some embodiments, the songs may be ranked for a user based on the user's geographic location. For example, songs that are popular or trending within the user's geographic location can be ranked higher than other songs. In some embodiments, the songs may be ranked for a user based on cultural events occurring in the user's geographic location. For example, songs that relate to an upcoming holiday in the user's geographic location can be ranked higher than other songs. Many variations are possible. A user can interact with the song selection interface to select a song to be associated with visual content being shared by the user. Once a song is selected, the user can then select a portion of the song to be associated with the visual content being shared, as described below.

The scrubbing module 206 can be configured to provide options for selecting a portion of a song to be associated with visual content being shared. For example, the scrubbing module 206 can provide a scrubbing interface that features a main playback scrubber that can be used to skip to different portions of the song. The scrubbing interface can also include a precision playback scrubber that can be used to precisely select the portion of the song to be associated with the visual content. More details regarding the scrubbing module 206 will be provided below with reference to FIG. 3.

Figure 3:
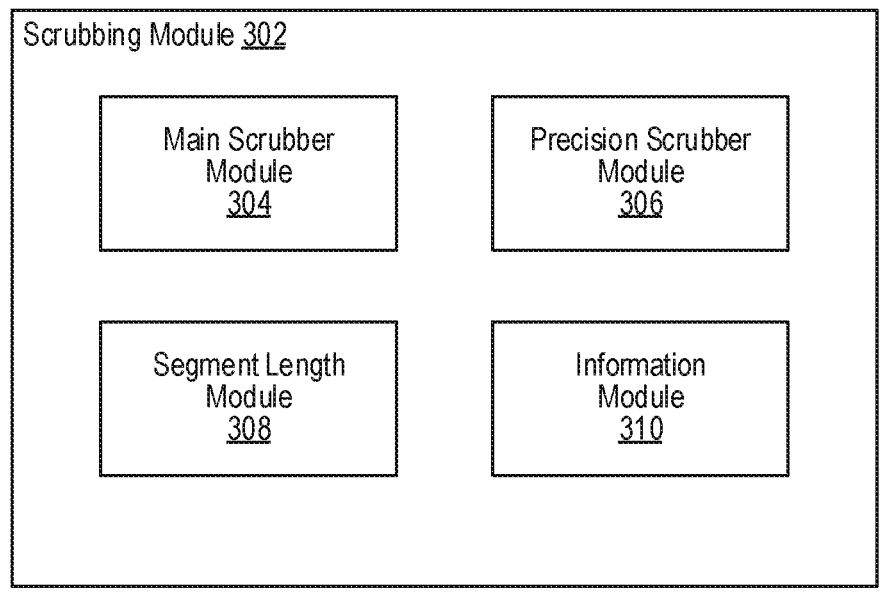
FIG. 3 illustrates an example scrubbing module, according to an embodiment of the present disclosure.

FIG. 3 illustrates a scrubbing module 302, according to an embodiment of the present disclosure. The scrubbing module 302 can provide a scrubbing interface (e.g., graphical user interface) through which a user can select a portion of a song to be associated with visual content being shared through the social networking system. In some embodiments, the scrubbing module 206 of FIG. 2 can be implemented with the scrubbing module 302. As shown in the example of FIG. 3, the scrubbing module 302 can include a main scrubber module 304, a precision scrubber module 306, a segment length module 308, and an information module 310.

The main scrubber module 304 can provide a main playback scrubber that can be accessed from the scrubbing interface. In various embodiments, the main playback scrubber is traversable across a fixed length bar that represents the entire length of a selected song. The main playback scrubber can be used to navigate to different parts of the selected song. For example, a user can interact with the main playback scrubber using touchscreen gestures to navigate to different time positions in the song. In some embodiments, the main playback scrubber is automatically positioned at the beginning of the selected song when the scrubbing interface is presented. In some embodiments, portions (or segments) of the song can be tagged based on various criteria. For example, a portion of a song that corresponds to a chorus can be tagged accordingly. In another example, a portion of a song that is often selected by users of the social networking system can be tagged as being popular. In such embodiments, the main playback scrubber can automatically be positioned at the beginning of some tagged portion (or segment) of the song when the scrubbing interface is presented. More details regarding the main playback scrubber will be provided below with reference to FIGS. 4A-4G.

The precision scrubber module 306 can provide a precision playback scrubber that can also be accessed from the scrubbing interface. In various embodiments, the precision playback scrubber provides a magnified representation of the length of the selected song. For example, in some embodiments, the precision playback scrubber can allow a user to navigate (or scroll) to any given position of the selected song at selected time intervals (e.g., second, half second, etc.). The precision playback scrubber can, therefore, be used to select portions of the song to be associated with visual content with greater precision than possible with the main playback scrubber. For example, a user can interact with the precision playback scrubber using touchscreen gestures to scroll to a particular time of the song. In some embodiments, the precision playback scrubber is automatically positioned at the beginning of the selected song when the scrubbing interface is presented. In some embodiments, the precision playback scrubber is automatically positioned at the beginning of a tagged portion of the selected song when the scrubbing interface is presented. For example, the precision playback scrubber can automatically be positioned at the beginning of a segment of the song that is popular among users, a segment of the song that includes a chorus, or a segment of the song corresponding to particular lyrics, to name some examples. Many variations are possible. More details regarding the precision playback scrubber will be provided below with reference to FIGS. 4A-4G.

The segment length module 308 can provide options for defining a playback length for a selected portion of a song. For example, in some embodiments, the segment length module 308 can permit a user to define a playback length of a selected portion of a song by selecting options associated with pre-defined lengths. For example, the user can select an option in the scrubbing interface to specify a playback length between 5 and 15 seconds. In some embodiments, the playback length can be defined by adjusting a length of the precision playback scrubber provided in the scrubbing interface. For example, the user can apply touchscreen gestures to increase a length of the precision playback scrubber so a longer portion of the song is selected. Similarly, the user can apply touchscreen gestures to decrease a length of the precision playback scrubber so a shorter portion of the song is selected. In some embodiments, the options provided by the segment length module 308 can vary depending on the type of visual content being shared. For example, in some embodiments, if the visual content being shared corresponds to an image, the segment length module 308 can provide options for defining a playback length of a selected portion of a song. In this example, the selected portion of the song can then be played for the entirety of the playback length as the image is presented through the social networking system. In some embodiments, if the visual content corresponds to a video, the segment length module 308 automatically defines a playback length of a selected portion of a song based on a length of the video being shared. For example, if the video is 10 seconds in length, then the segment length module 308 can ensure the selected portion of the song is also 10 seconds in length. Many variations are possible.

The information module 310 can provide various information that can aid users when selecting portions of songs to be associated with visual content. For example, in some embodiments, the information module 310 can present song lyrics within the scrubbing interface as a user scrubs through a song using the main or precision playback scrubbers. In some embodiments, the scrubbing interface can visually indicate tagged portions of a song. For example, portions (or segments) of the song can be tagged in advance based on various criteria. For example, a portion of the song that corresponds to a chorus can be tagged accordingly. In another example, a portion of the song that is often selected by users of the social networking system can be tagged as being popular. Many variations are possible. In such embodiments, the information module 310 can visually indicate tagged portions of the song within the scrubbing interface, as shown below with reference to FIGS. 4A-4G. A user can simply select any of the tags to skip to a particular segment of a song that is of interest.

Figure 4A:
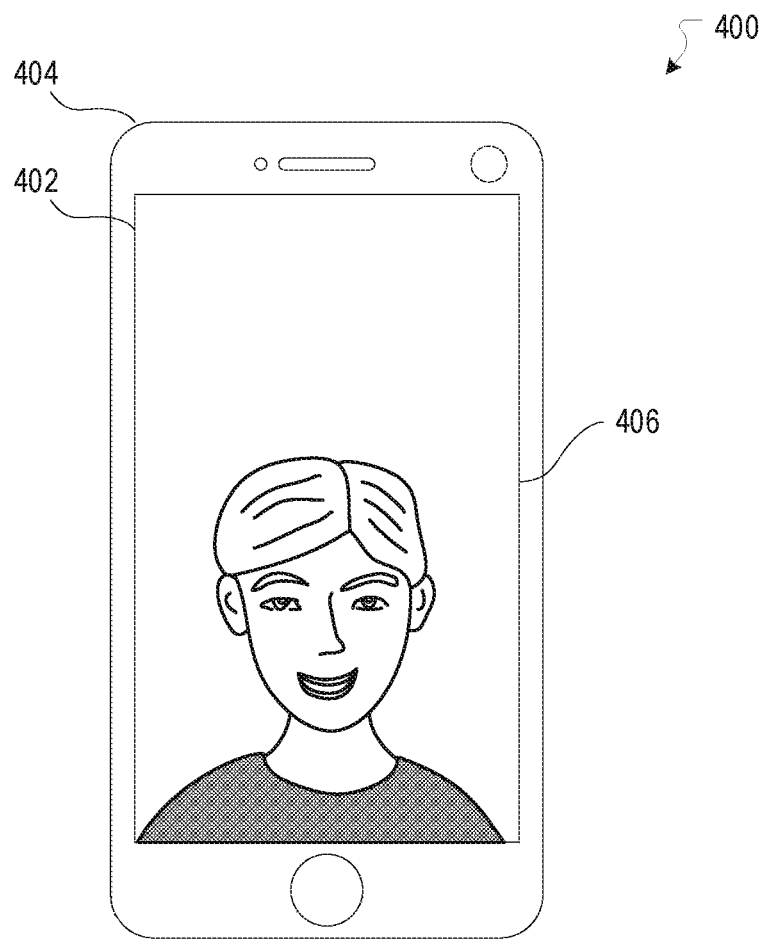
FIG. 4A-4G illustrate example interfaces, according to an embodiment of the present disclosure.
Figure 4B:
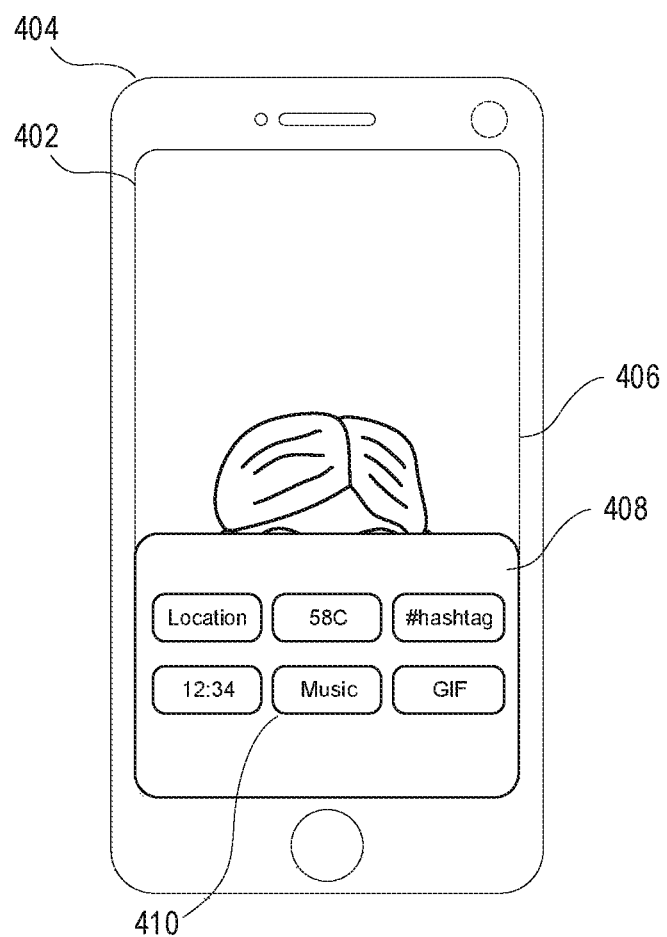
Figure 4C:
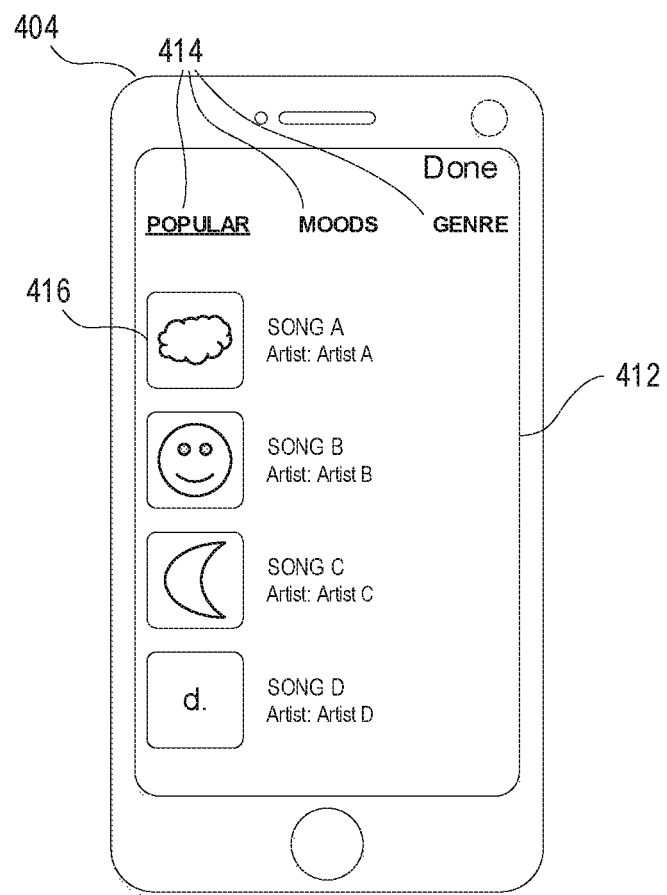
Figure 4D:
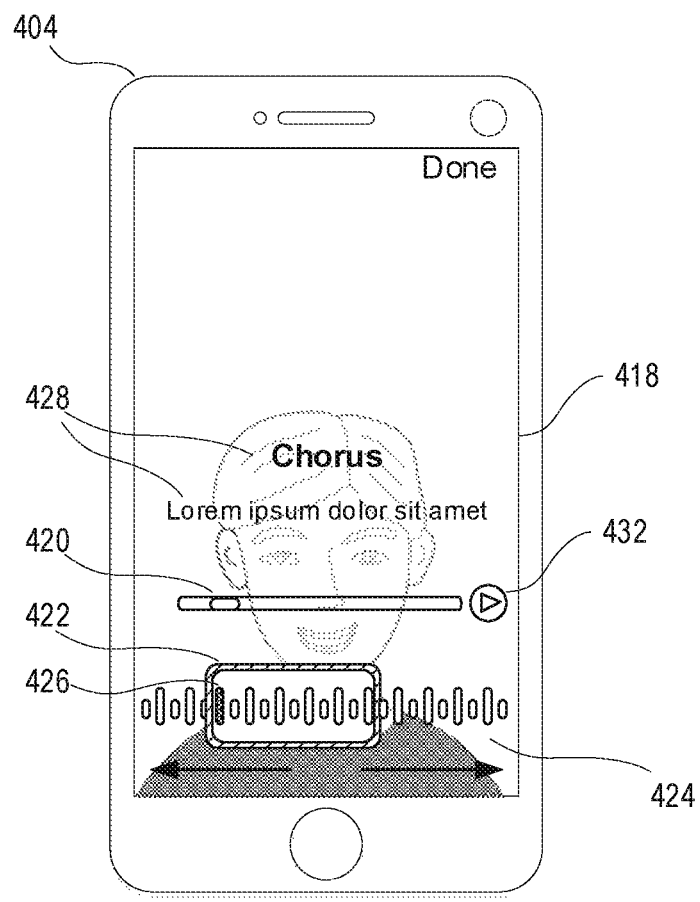
Figure 4E:
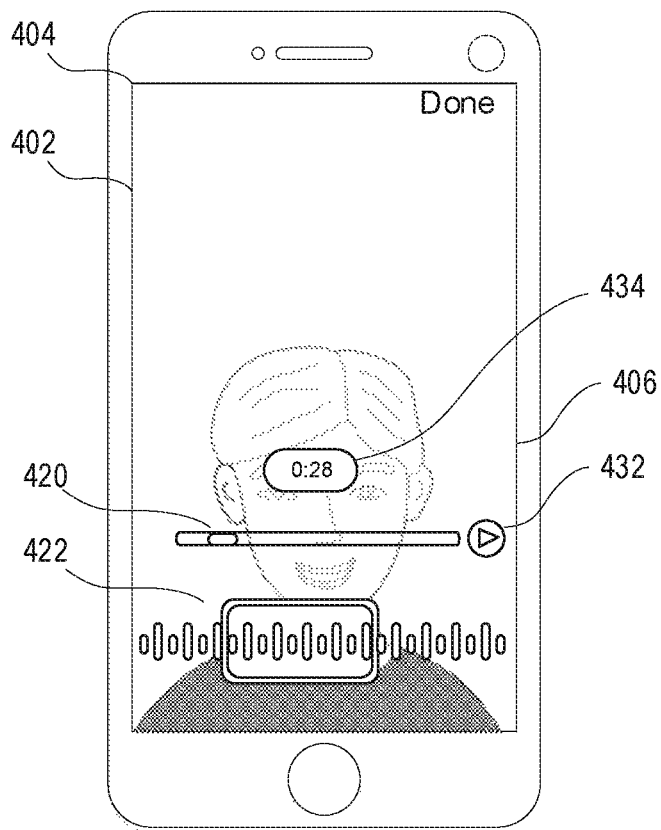
Figure 4F:
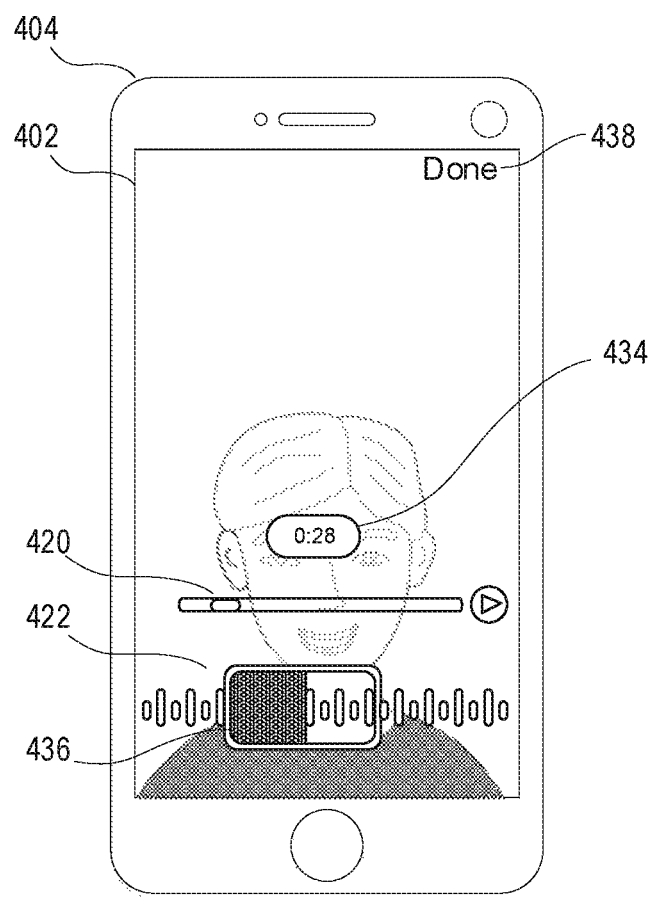
Figure 4G:
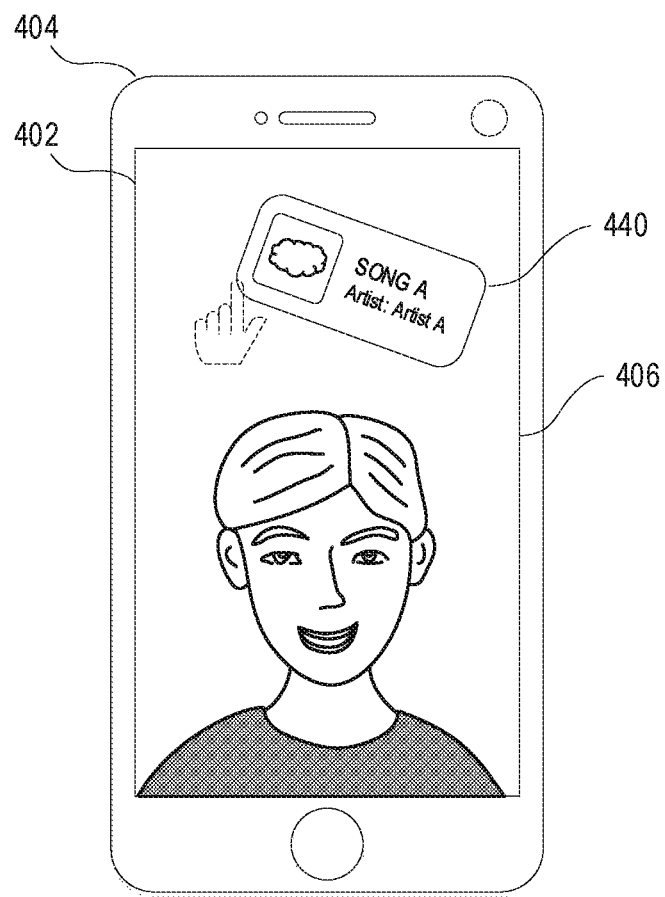

FIG. 4A illustrates an example 400 of an interface 402 that can be implemented by the content generation module 102, according to an embodiment of the present disclosure. In this example, the interface 402 is presented through a display screen of a computing device 404. Further, the interface 402 may be provided through an application (e.g., a web browser, a social networking application, messenger application, etc.) running on the computing device 404 that is configured to interact with the social networking system. In the example of FIG. 4A, the interface 402 is accessing visual content 406 to be posted (or shared) through the social networking system. The visual content 406 may be an image, video, or looping video, to name some examples. In some instances, a user operating the computing device 404 may provide the visual content 406 to be posted, for example, from a data store. In some instances, the user may capture the visual content 406 through a camera interface using one or more cameras of the computing device 404. In various embodiments, the user operating the computing device 404 can access a sticker interface 408 for inserting visual overlays (e.g., stickers) in the visual content 406, as illustrated in the example of FIG. 4B. In some embodiments, a music sticker 410 can be selected to associate portions of musical content with the visual content 406. For example, a song selection interface 412 can be presented when the music sticker 410 is selected, as illustrated in the example of FIG. 4C. The song selection interface 412 can provide one or more listings of songs that can be selected. In some embodiments, the song selection interface 412 can include multiple categories of songs 414 (e.g., popular, mood, genre, etc.). In some embodiments, songs within each category can be ranked, as described above. In the example of FIG. 4C, the user operating the computing device 404 can select a song 416 to be associated with the visual content 406. A scrubbing interface 418 can be shown after selecting the song 416, as illustrated in the example of FIG. 4D. The scrubbing interface 418 can provide a main playback scrubber 420 and a precision playback scrubber 422. The main playback scrubber 420 can be used to skip to different portions of the song 416. The precision playback scrubber 422 can be used to precisely select a portion of the song 416 to be associated with the visual content 406. In general, the precision playback scrubber 422 can permit the user to select a particular portion of the song 416 with greater precision than would be possible using the main playback scrubber 420. The precision playback scrubber 422 can achieve a higher threshold level of time granularity in comparison to the main playback scrubber 420. For example, the user can navigate the song 416 by applying touchscreen gestures to scroll the precision playback scrubber 422 horizontally to the left or right. In this example, scrolling the precision playback scrubber 422 to the left allows selection of an earlier segment of the song 416 while scrolling the precision playback scrubber 422 to the right allows selection of a subsequent segment of the song 416. In some embodiments, the song 416 is discretized, for example, into one second segments 424. In such embodiments, the precision playback scrubber 422 can be used to scroll through the song 416 on a second-by-second basis. In some embodiments, segments of the song 416 can be tagged, as described above. In such embodiments, the precision playback scrubber 422 can visually indicate when a tagged segment of the song 416 is selected. For example, selection of a tagged segment of the song 416 can be signified by presentation of an outer ring corresponding to the precision playback scrubber 422 using colors or a color gradient. In the example of FIG. 4D, a portion 426 of the song 416 that corresponds to the beginning of a chorus can be associated with a chorus tag. The portion 426 can be identified visually, for example, using color or text. In some embodiments, the scrubbing interface 418 can provide information 428 which identifies the tagged portion 426 as a chorus. In some embodiments, the information 428 can provide lyrics of the song 416 that correspond to the portion of the song 416 that was selected using the precision playback scrubber 422. In some embodiments, the scrubbing interface 418 includes an option 432 that can be accessed to play the selected portion of the song or to stop (or pause) playback of the selected portion of the song. In some embodiments, a timestamp 434 representing a start time of the selected portion of the song 416 can be presented, as illustrated in the example of FIG. 4E. The timestamp 434 can be updated as the user navigates the song 416 using either the main playback scrubber 420 or the precision playback scrubber 422. In general, the user can scrub to different portions of the song 416 both when the song 416 is playing or when playback of the song 416 is stopped. Further, playback of the song 416 can cease when the user scrubs to different portions of the song 416 and can resume playing from the beginning of a selected portion of the song 416 when the user stops scrubbing. Many variations are possible. In some embodiments, a gradient 436 fills the precision playback scrubber 422 as a selected portion of the song 416 is being played, as illustrated in the example of FIG. 4F. Once a desired portion (or segment) of the song 416 is selected, the user can select a done option 438. In response, the visual content 406 can be associated with the selected portion (or segment) of the song 416, as illustrated in the example of FIG. 4G. In some embodiments, a music sticker 440 referencing the song 416 and the selected portion of the song 416 can be included within the visual content 406 as a graphical overlay (e.g., sticker).

Figure 5:
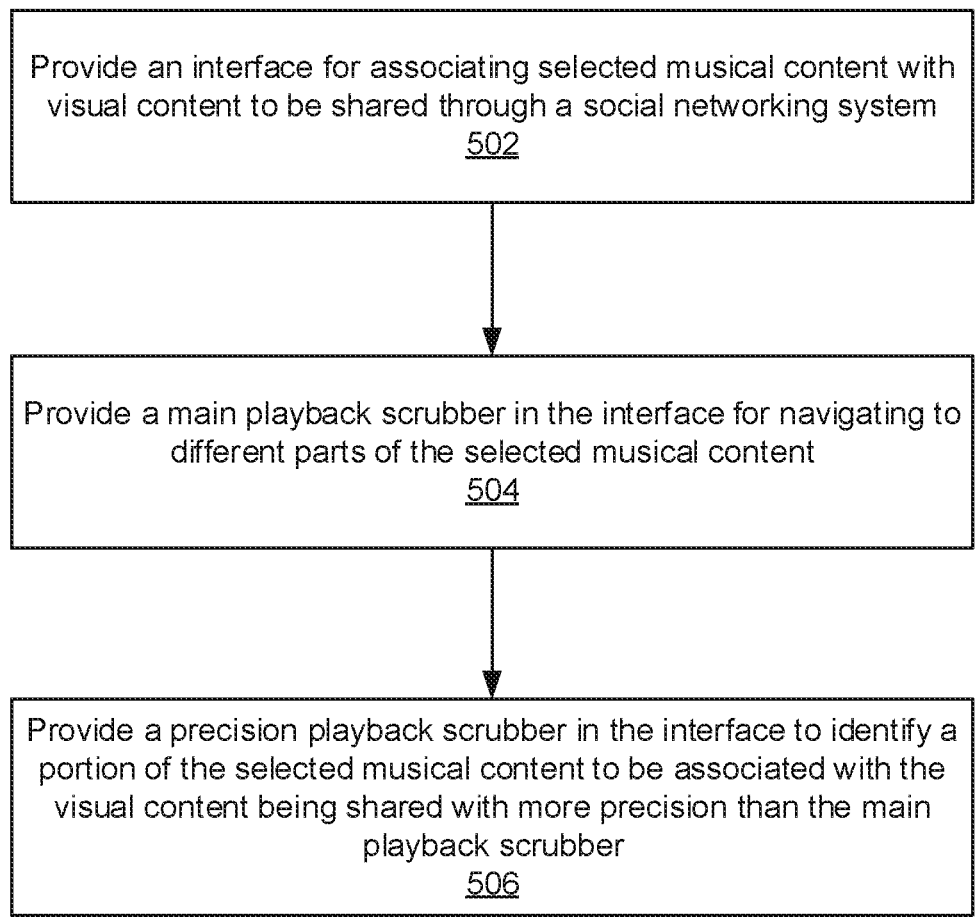
FIG. 5 illustrates an example method, according to an embodiment of the present disclosure.

FIG. 5 illustrates an example method 500 for distributing graphical overlays, according to an embodiment of the present disclosure. It should be appreciated that there can be additional, fewer, or alternative steps performed in similar or alternative orders, or in parallel, within the scope of the various embodiments discussed herein unless otherwise stated.

At block 502, an interface for associating selected musical content with visual content to be shared through a social networking system can be provided. At block 504, a main playback scrubber for navigating to different parts of the selected musical content can be provided in the interface. At block 506, a precision playback scrubber for identifying a portion of the selected musical content to be associated with the visual content being shared can be provided in the interface with more precision than the main playback scrubber.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
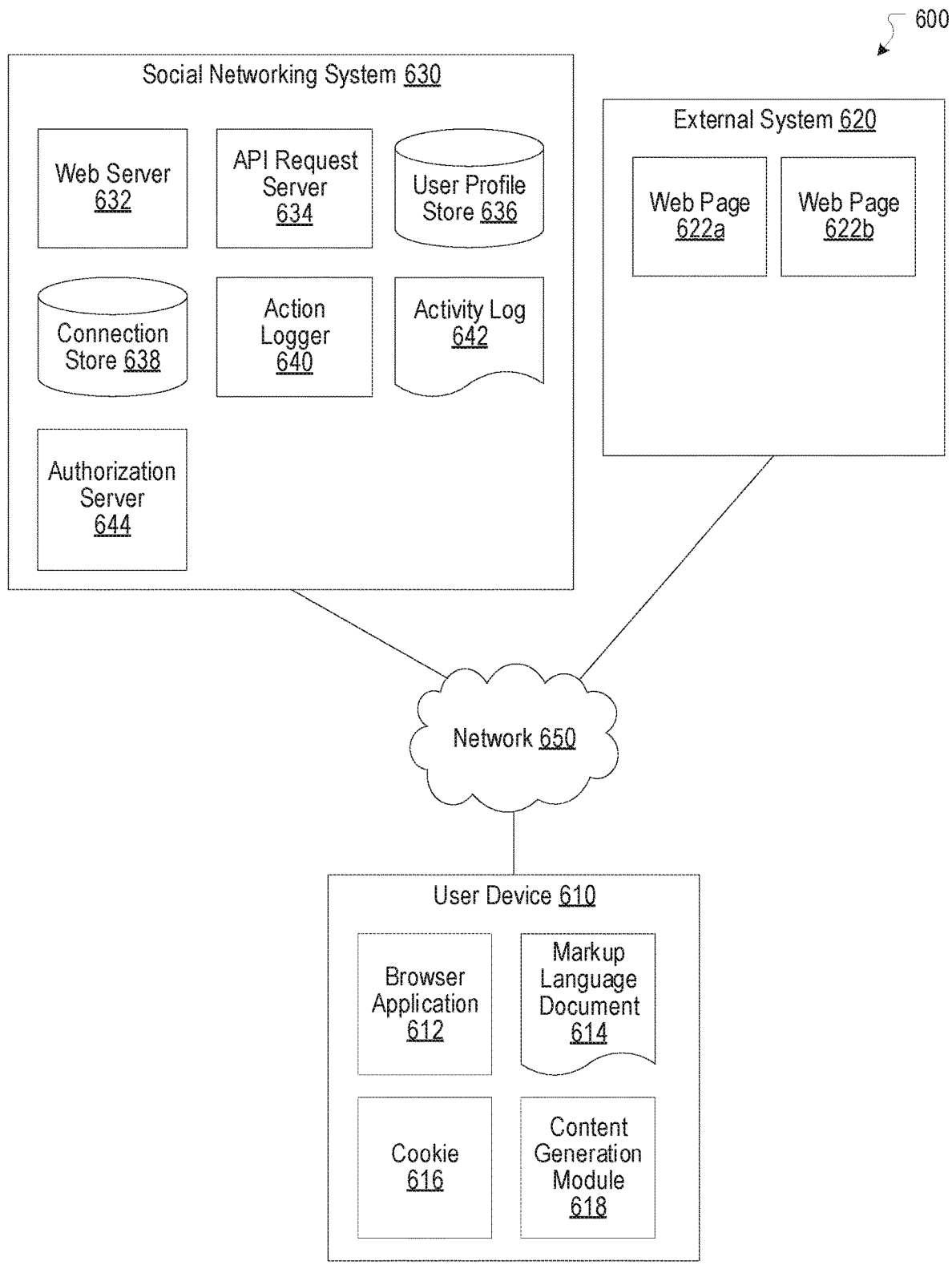
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content generation module. The content generation module, for example, can be implemented as some or all of the functionality of the content generation module 102 of FIG. 1. In some embodiments, some or all of the functionality of the content generation module 102 of FIG. 1 can be provided in a content generation module 618 implemented in the user device 610. As discussed previously, it should be appreciated that there can be many variations or other possibilities.

Hardware Implementation

Figure 7:
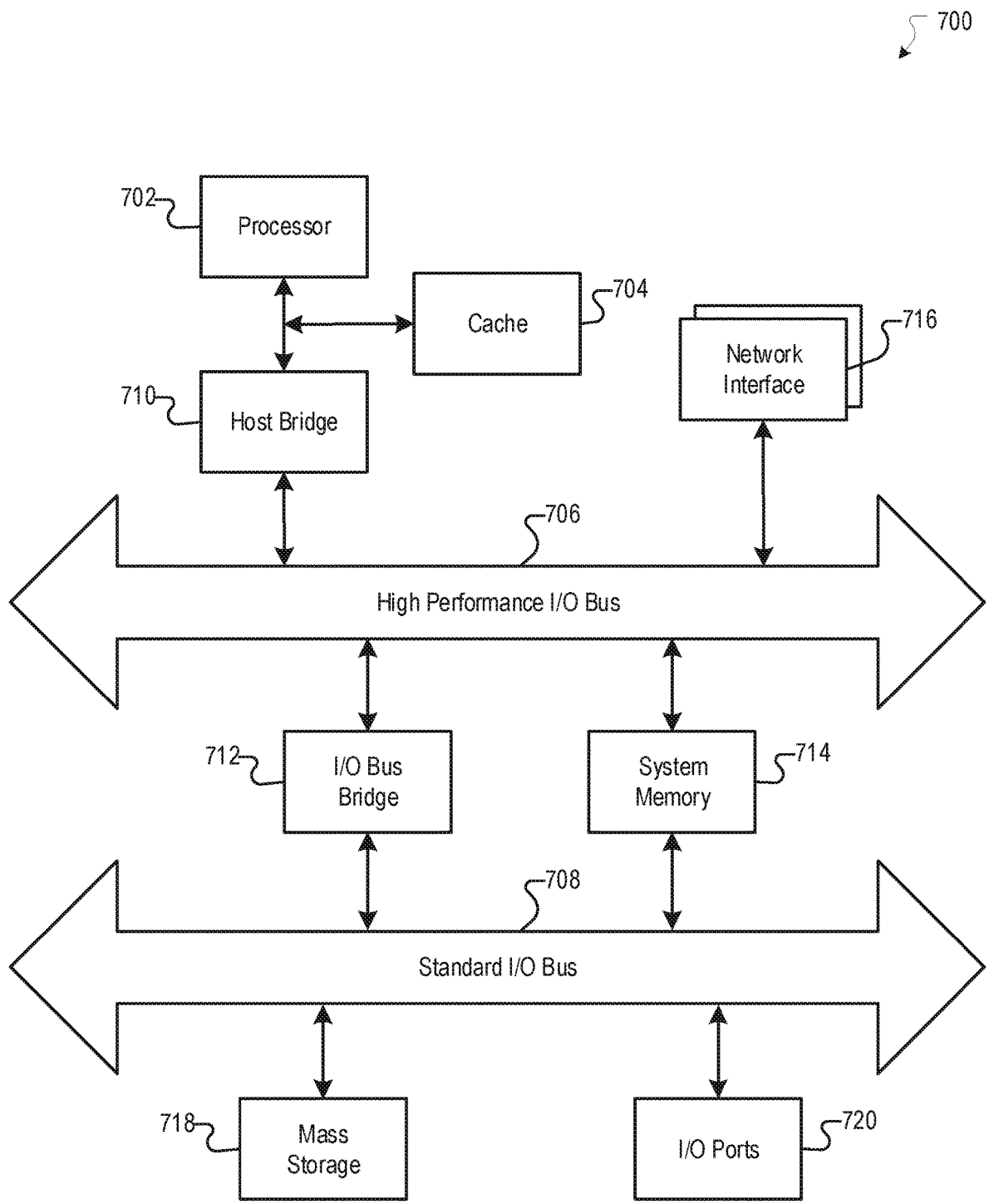
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing device, an interface to associate musical content with visual content;
   providing, by the computing device, a main playback scrubber in the interface to navigate to different parts of the musical content;
   providing, by the computing device, a precision playback scrubber in the interface to identify a portion of the musical content to be associated with the visual content with more precision than the main playback scrubber;
   determining, by the computing device, the musical content to be associated with the visual content based on the main playback scrubber and the precision playback scrubber, the determining further comprising:
   identifying, by the computing device, a part of the musical content based on a position associated with the main playback scrubber; and
   determining, by the computing device, a selected length of the musical content that corresponds to the identified part based on the precision playback scrubber, wherein the selected length is shorter than a length of the musical content;
   in response to a determination that at least a portion of the identified part of the musical content is associated with a tagged segment of the musical content, providing, by the computing device, the precision playback scrubber comprising a continuous boundary to visually indicate that the tagged segment of the musical content is selected, wherein the tagged segment is a portion of the musical content; and
   associating, by the computing device, the determined musical content with the visual content.

2. The computer-implemented method of claim 1, wherein the main playback scrubber is traversable across a fixed length bar that represents an entire length of the musical content.

3. The computer-implemented method of claim 1, wherein the precision playback scrubber provides a magnified representation of an entire length of the musical content, wherein the precision playback scrubber is able to be scrolled to any given second of the musical content.

4. The computer-implemented method of claim 1, wherein the tagged segment is associated with information describing the identified part of the musical content as particular lyrics.

5. The computer-implemented method of claim 1, wherein the tagged segment is associated with information describing the identified part of the musical content as a chorus.

6. The computer-implemented method of claim 1, wherein the tagged segment is associated with information describing the identified part of the musical content as content that is popular among users of a content provider system.

7. The computer-implemented method of claim 1, wherein the interface presents lyrics corresponding to the identified part of the musical content.

8. The computer-implemented method of claim 1, the method further comprising:
   sharing, by the computing device, the visual content and the musical content associated with the visual content through a content provider system, wherein the musical content is played when the visual content is accessed.

9. The computer-implemented method of claim 1, wherein the visual content corresponds to an image, a video, or a looping video.

10. A system comprising:
    at least one processor; and
    a memory storing instructions that, when executed by the at least one processor, cause the system to perform:
    providing an interface to associate musical content with visual content;

providing a main playback scrubber in the interface to navigate to different parts of the musical content;

providing a precision playback scrubber in the interface to identify a portion of the musical content to be associated with the visual content with more precision than the main playback scrubber;

determining the musical content to be associated with the visual content based on the main playback scrubber and the precision playback scrubber, the determining further comprising:

identifying a part of the musical content based on a position associated with the main playback scrubber; and determining a selected length of the musical content that corresponds to the identified part based on the precision playback scrubber, wherein the selected length is shorter than a length of the musical content;

in response to a determination that at least a portion of the identified part of the musical content is associated with a tagged segment of the musical content, providing the precision playback scrubber comprising a continuous boundary to visually indicate that the tagged segment of the musical content is selected, wherein the tagged segment is a portion of the musical content; and associating the determined musical content with the visual content.

11. The system of claim 10, wherein the main playback scrubber is traversable across a fixed length bar that represents an entire length of the musical content.

12. The system of claim 10, wherein the precision playback scrubber provides a magnified representation of an entire length of the musical content, wherein the precision playback scrubber is able to be scrolled to any given second of the musical content.

13. The system of claim 10, wherein the tagged segment is associated with information describing the identified part of the musical content as particular lyrics.

14. The system of claim 10, wherein the tagged segment is associated with information describing the identified part of the musical content as a chorus.

15. A non-transitory computer-readable storage medium including instructions that, when executed by at least one processor of a computing system, cause the computing system to perform a method comprising:

providing an interface to associate musical content with visual content;

providing a main playback scrubber in the interface to navigate to different parts of the musical content;

providing a precision playback scrubber in the interface to identify a portion of the musical content to be associated with the visual content with more precision than the main playback scrubber;

determining the musical content to be associated with the visual content based on the main playback scrubber and the precision playback scrubber, the determining further comprising:

identifying a part of the musical content based on a position associated with the main playback scrubber; and determining a selected length of the musical content that corresponds to the identified part based on the precision playback scrubber, wherein the selected length is shorter than a length of the musical content;

in response to a determination that at least a portion of the identified part of the musical content is associated with a tagged segment of the musical content, providing the precision playback scrubber comprising a continuous boundary to visually indicate that the tagged segment of the musical content is selected, wherein the tagged segment is a portion of the musical content; and associating the determined musical content with the visual content.

16. The non-transitory computer-readable storage medium of claim 15, wherein the main playback scrubber is traversable across a fixed length bar that represents an entire length of the musical content.

17. The non-transitory computer-readable storage medium of claim 15, wherein the precision playback scrubber provides a magnified representation of an entire length of the musical content, wherein the precision playback scrubber is able to be scrolled to any given second of the musical content.

18. The non-transitory computer-readable storage medium of claim 15, wherein the tagged segment is associated with information describing the identified part of the musical content as particular lyrics.

19. The non-transitory computer-readable storage medium of claim 15, wherein the tagged segment is associated with information describing the identified part of the musical content as a chorus.

* * * * *